United States Patent [19]

McLeod

[11] 4,042,872
[45] Aug. 16, 1977

[54] STATIC CONVERTER HAVING PARTIALLY GAPPED TRANSFORMER

[76] Inventor: James A. McLeod, 224 N. Red Oak Drive East, Sunnyvale, Calif. 94086

[21] Appl. No.: 644,444

[22] Filed: Dec. 29, 1975

[51] Int. Cl.² .......................................... H02M 3/335
[52] U.S. Cl. ........................................ 363/20; 363/56
[58] Field of Search .................... 321/2, 12, 18, 45 R; 331/113 A; 323/48, 56

[56] References Cited

U.S. PATENT DOCUMENTS

| 1,739,699 | 12/1929 | Whittle | 323/56 |
| 3,539,905 | 11/1970 | Schwarz | 321/2 |
| 3,541,428 | 11/1970 | Schwarz | 321/2 |
| 3,611,330 | 10/1971 | Cacossa | 321/45 R |
| 3,660,751 | 5/1972 | Bullinga | 321/2 |
| 3,697,855 | 10/1972 | Kernick et al. | 321/12 |
| 3,914,680 | 10/1975 | Hesler et al. | 321/18 |

OTHER PUBLICATIONS (S0107 0020), IEEE Transactions on Magnetics, vol. MAG-S, No. 4, Dec. 1969, pp. 908-912.
*Saturating Core Devices,* by Leonard R. Crow, The Scientific Book Publishing Co., Vincennes, Ind., 1949, pp. 162-164.

*Primary Examiner*—William H. Beha, Jr.
*Attorney, Agent, or Firm*—Boone, Schatzel, Hamrick & Knudsen

[57] ABSTRACT

A static converter utilizing a transformer core having a gapped auxiliary flux path with a reluctance differing from that of another flux path, and a main flux path about which the primary and secondary converter windings are wrapped and through which the flux in both the auxiliary path and the other path pass. A sense winding is wrapped about the other path so as to develop on saturation a signal which can be used to deenergize the primary winding before saturation of the main flux path and thereby prevent the generation of high current surges through the switching transistors in the primary circuit.

13 Claims, 17 Drawing Figures

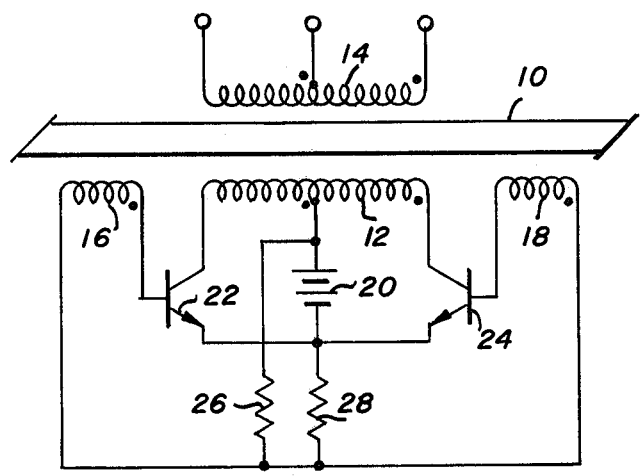
Fig_1
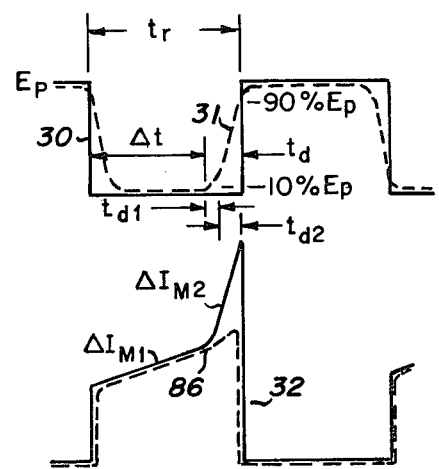
Fig_2
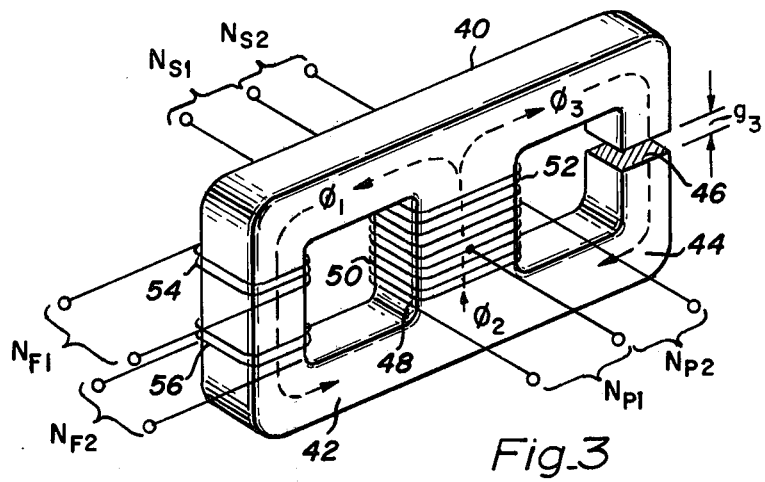
Fig_3
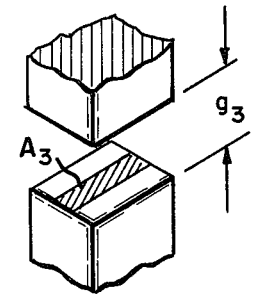
Fig_3A
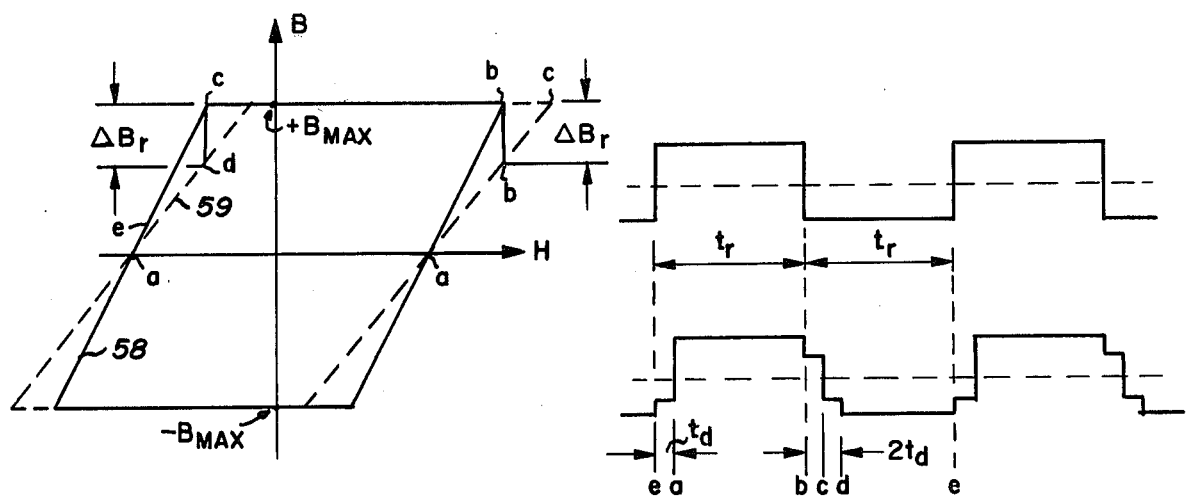
Fig_4
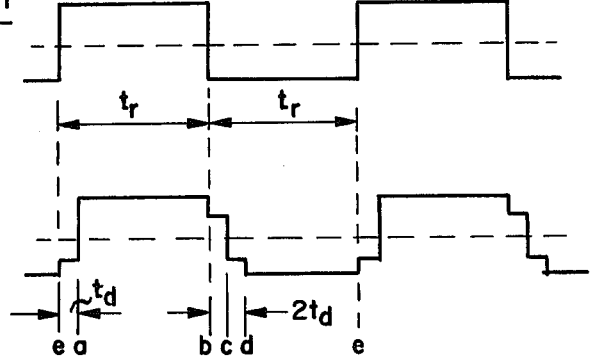
Fig_5

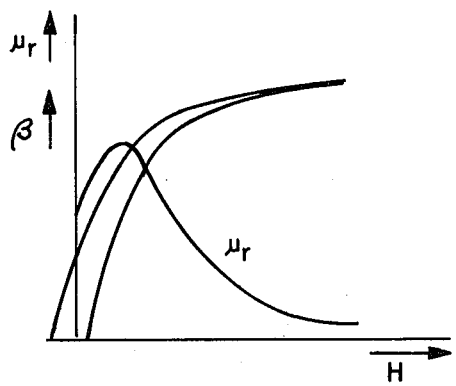
Fig_5A
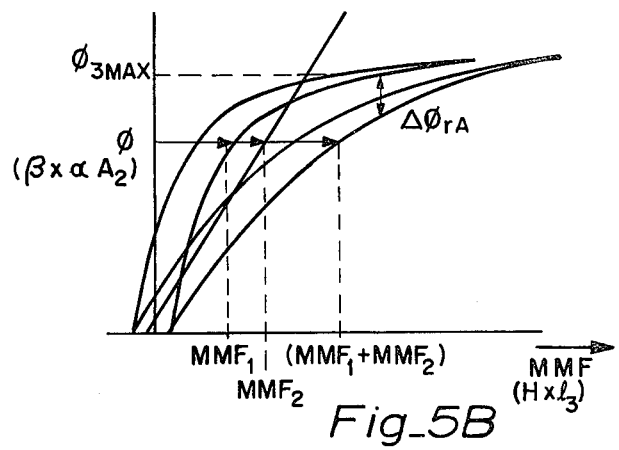
Fig_5B
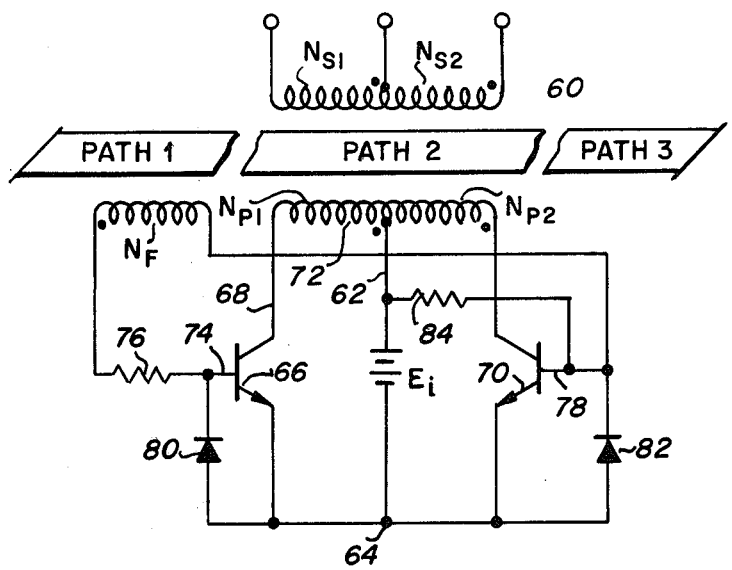
Fig_6
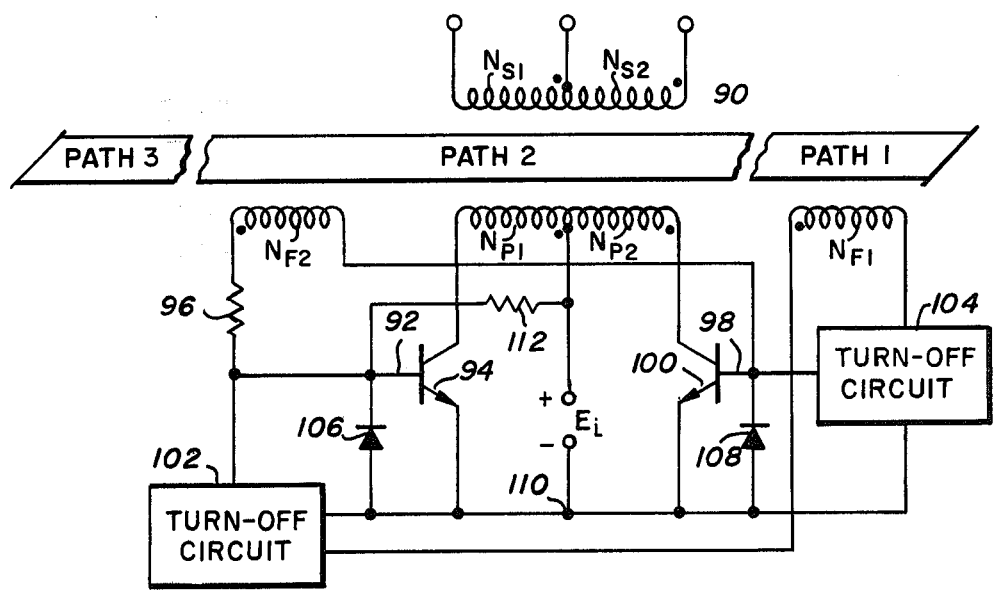
Fig_7

4,042,872

STATIC CONVERTER HAVING PARTIALLY GAPPED TRANSFORMER

SUMMARY OF THE PRESENT INVENTION

The present invention relates generally to signal conversion apparatus and more particularly to an improved static converter having means for reducing the required power handling capability of and increasing the useful life of the switching transistors used in the primary circuit.

Briefly, a preferred embodiment of the present invention includes a power supplying input circuit, a partially gapped transformer core and an output circuit. The transformer features a partially gapped core having a predetermined flux linkage capability which allows an ungapped portion of the core to saturate before the main core portion. A sense winding about the ungapped portion is used to provide a signal for initiating turn-OFF of the primary circuit as the ungapped portion saturates, thus terminating each half-cycle of operation before the main core portion saturates. This eliminates the high saturation current surges that are usually encountered in conventional static converters. An additional feature of the present invention is the capability to maximize utilization of the core material and thereby minimizes the core size requirements.

Expressions and techniques, which may be used to simplify determination of optimum air gap length and cross sectional area, for this maximization are provided.

IN THE DRAWING

FIG. 1 is a schematic diagram illustrating the basic components of a conventional static converter.

FIG. 2 is a diagram illustrating voltage and current waveforms for use in comparing operation of the conventional converter to operation of the present invention;

FIGS. 3 and 3A illustrate a transformer core in accordance with the present invention;

FIG. 4 is a diagram of idealized hysteresis loops used to illustrate operation of the present invention;

Figure 8:
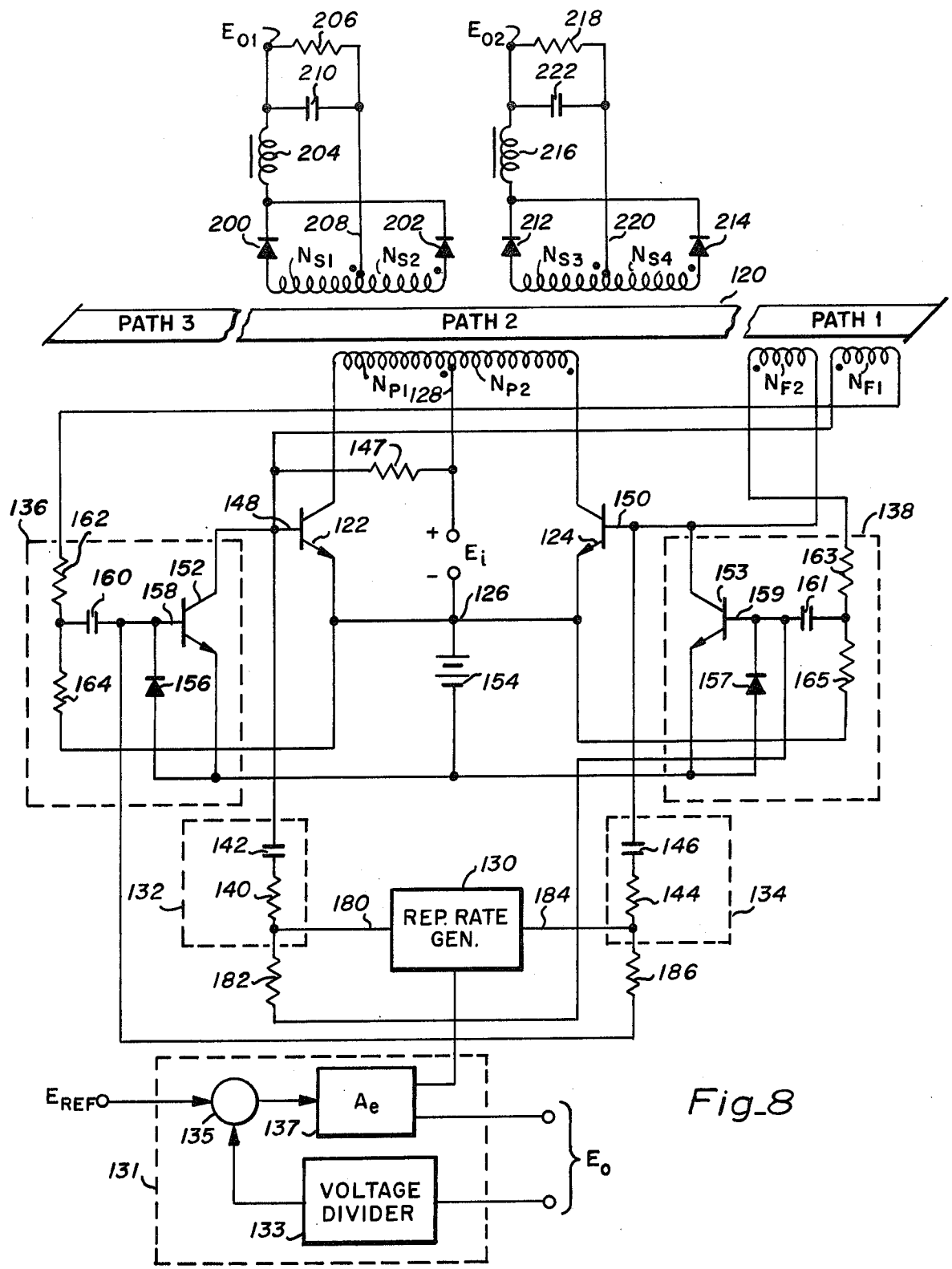

FIGS. 5, 5A, and 5B are various diagrams used to illustrate the design and operation of the present invention;

FIGS. 6–8, 11 and 14 are schematic diagrams illustrating various embodiments of inverter circuits in accordance with the present invention; and FIGS. 9, 10, 12, and 13 are timing and hysteresis diagrams used to illustrate operation of the present invention.

DETAILED DESCRIPTION OF THE PREFERRED EMBODIMENTS

In FIG. 1 of the drawing, there is shown a schematic diagram of a conventional single-core DC/DC converter comprised of a magnetic transformer core shown schematically at 10, a center-tapped primary winding 12, a center-tapped secondary winding 14 and a pair of feedback drive windings 16 and 18. Current is supplied through one-half of the primary winding 12 by a DC voltage source, indicated schematically as a battery 20, so long as one of the transistors 22 and 24 are conductive. A pair of resistors 26 and 28 provide biasing for transistors 22 and 24. Control of the transistors 22 and 24 is achieved by means of feedback currents induced in the feedback winding 16 and 18, respectively, by flux developed in core 10. The core 10 is typically a toroid or a ferrite cup.

Waveforms representative of the voltage and current developed in each loop are respectively illustrated in FIG. 2 of the drawing. More particularly, the voltage developed across one of the transistors during one cycle of its operation is depicted by waveform 30, while the corresponding current flowing through the transistor is illustrated by the waveform 32. It will, of course, be appreciated that the voltage and current waveforms corresponding to the other transistor are similar in shape but are displaced by 180°. Note the high current surge which occurs during the switch turn-OFF delay time $t_d$ (transistors 22 and 24 are power switching transistors). This is caused by the abrupt decrease in primary inductance which occurs when transformer core 10 saturates. Because of the low level of saturated inductance the primary current generally rises, as illustrated by $\Delta I_{m2}$, to a sufficiently high level so as to cause the conducting transistor to go into beta limiting and be pulled out of its conducting state. These high current surges are highly objectionable in terms of efficiency, high instantaneous transistor power stress, and RFI generation.

One prior art attempt to obviate the generation of excessive output current spikes is disclosed in U.S. Pat. No. 3,660,751, to *Bullinga* and uses a dual-metal transformer core having one flux path formed of iron and a second flux path formed of a ferrite material. Such apparatus is believed however to fall short of fulfilling the objectives of the present invention.

Referring now to FIG. 3 of the drawing there is shown a partially gapped transformer core 40 in accordance with the present invention which is generally in the shape of a FIG. 8 and includes a first loop 42 and a second loop 44. Loop 42 is typically complete and uninterrupted but loop 44 is provided with a gap 46 having predetermined dimensions as will be explained in more detail below. Wrapped around the central core portion 48 are a primary winding 50 which is center-tapped to effectively provide a pair of primary windings $N_{p1}$ and $N_{p2}$, and a secondary winding 52 which is also center-tapped to effectively provide a pair of secondary windings $N_{s1}$ and $N_{s2}$. The effective cross sectional area of 48 is, in general, equal to the sum of the effective cross sectional areas of 42 and 44. The feedback (sense) windings 54 and 56 are wrapped around the outer leg of loop 42. Core 40 thus includes three principal magnetic flux paths $\phi_1$, $\phi_2$, and $\phi_3$, where the main path $\phi_2$ shares the total flux with the auxiliary paths $\phi_1$ and $\phi_2$. The primary winding ($N_p$) 50 encloses path $\phi_2$ and thus simultaneously encloses both $\phi_1$ and $\phi_3$. This path is also enclosed by the secondary winding ($N_s$) 52, the load winding. Assuming that the core dimensions of loops 42 and 44 are equal, it will be appreciated that because of the gap 46 the magnitude of the flux flowing in path $\phi_3$ will be less than the flux flowing in path $\phi_1$, and that the difference is determined by the dimensions of gap 46.

If a step voltage is applied across winding 50, or either half thereof, path 1 will saturate first, then the primary inductance will reduce to a value that is largely determined by the length and cross section of the air gap 46. It is intuitively true that this saturated inductance is many orders of magnitude higher than the condition where path $\phi_3$ does not exist. Without path $\phi_3$ the saturated inductance would be determined essentially by the air inductance of path 1 loop length $l_1$. When a conventional converter transformer saturates on one end, it is this practical air core inductance that causes the high magnetizing current to be developed during the power switch turn-OFF delay time $t_d$. However, in accordance with the present invention, a gapping of the other end of the core can be used to prevent the central core path $\phi_2$ from saturating before the end of delay time $t_d$. Although the air gap length and cross sectional area of gap 46 can be selected more or less at random to provide an effective "secondary" primary inductance after path 1 saturates, the present invention provides a method of developing expressions for use in optimizing the dimensions of gap 46 in order to achieve maximum utilization of the core material.

Two criteria are used to determine the optimum length and cross section of gap 46. These are (1) to keep path 3 just below saturation during $t_d$ and (2) to use the minimum peak magnetizing current in the primary windings $N_p$. The flux density level in path 3 should be just the right amount below its saturation level to support $E_p$ (the voltage across $N_p$) during the power switch delay $t_d$. In other words path 3 should have a predetermined flux density reverse ($\Delta \beta_r$ — see FIG. 4) after path 1 saturates to keep it from going past its saturation point during the time $t_d$ when it is supporting all of the $N_p$ voltage. In this way path 3 is driven to its saturation point (and no further) at the end of $t_d$ so as to give maximum utilization of the ferro-magnetic core material. As a result, the smallest possible transformer for a given application may be used.

In the development of the expressions to satisfy the first criteria, the material used for the core 40 will be assumed to have the ideal magnetic characteristics shown in FIG. 4. The solid line 58 represents the magnetic characteristic of the ungapped path 1 while the dotted line 59 represents the magnetic characteristic of the gapped path 3. The reserve flux density ($\Delta \beta_r$) is the difference in the flux density levels of paths 1 and 3 at the time path 1 saturates. During the power switch tur-OFF delay time $t_d$, the input voltage $E_p$ will be supported by path 3. Thus, from Lenz's Law the reserve flux density can be written as $$\Delta \beta_r = \frac{(E_p)(t_d)}{(N_p)(A_3)} \tag{1}$$

where
$E_p$ is the voltage across the primary winding $N_p$,
$N_p$ is the number of primary turns,
$t_d$ is the power switch turn-OFF delay time, and
$A_3$ is the cross sectional area of the gap in path 3.
In this expression, $\Delta \beta_r$ is the required flux density reserve necessary in path 3 to keep it from being driven beyond its saturation point during the delay time $t_d$.

For simplification it is assumed that during $t_d$, the converter switch is fully ON and then turns OFF in zero time such as is illustrated by curve 30 in FIG. 2. However, sometimes the switch excursion from full ON to full OFF can be an appreciable portion of the turn OFF delay ($t_d$). An example of this is shown by the dashed line 31 in FIG. 2. For this case, a close approximation for $\Delta \beta_r$ can be made by breaking $t_d$ into two segments, $t_{d1}$ and $t_{d2}$. Then, eq. (1) can be rewritten as, $$\Delta \beta_r = \Delta \beta_{r1} + \Delta \beta_{r2} \tag{1a}$$

$$\tag{1b}$$

—continued $$\Delta \beta_{r1} = \frac{(E_p)(t_{d1})}{(N_p)(A_3)} \tag{1c}$$

$$\Delta \beta_{r2} = \frac{1}{N_p A_3} \left[ E_p - \int_0^{t_{d2}} e_p(t) dt \right]$$

The switch is assumed to be fully ON up to a point where it has absorbed 10 percent of $E_p$ during its turn-OFF excursion. This is the first portion $t_{d1}$ of $t_d$. From 10 percent to 90 percent of $E_p$, the switch is assumed to have gone through its full ON to full OFF excursion. This is the second portion $t_{d2}$ or $t_d$. With small error, this full ON to full OFF excursion of the switch can be assumed linear. With these approximations, eq. (1c) can be rewritten as $$\Delta \beta_{r2} = \frac{E_p t_{d2}}{2 A_3 N_p} \tag{1d}$$

and adding eq. (1a) and (1d), $$\Delta \beta_r = \frac{E_p}{A_3 N_p} \left( t_{d1} + \frac{t_{d2}}{2} \right) \tag{1e}$$

Thus, for situations where the switch excursion from full ON to full OFF is an appreciable portion of the total turn-OFF delay, $t_{d1} + (t_{d2}/2)$ can be substituted where $t_d$ occurs in the expressions developed herein.

To insure that the flux density reserve in eq. (1) is always available, the general expression for the differences in flux density in paths 1 and 3 will be derived. If paths 1 and 3 are of uniform cross section, their respective permeances ($\rho$) are:

$$\rho_1 = \frac{\beta_1 A_1}{H_1 l_1} \tag{2}$$

and $$\rho_3 = \frac{\beta_3 A_3}{H_3 l_3} . \tag{3}$$

where
$\beta_1$ and $\beta_3$ are the instantaneous flux density levels in paths 1 and 3,
$A_1$ and $A_3$ are the cross sectional areas of paths 1 and 3,
$l_1$ and $l_3$ are the mean lengths of paths 1 and 3,
$H_1$ and $H_3$ are the magnetic potential gradients of paths 1 and 3.

Since the primary winding $N_p$ encloses both magnetic paths, the total ampere turns (Hl) is the same for both paths 1 and 3. Thus, $$H_1 l_1 = H_3 l_3 \tag{4}$$

and combining eqs. (2), (3) and (4)

$$\beta_3 = \frac{\rho_3}{\rho_1} \times \frac{A_1}{A_3} \beta_1 . \tag{5}$$

Thus, the flux density difference between paths 1 and 3 is $$\beta_1 - \beta_3 = \beta_1 \left( \frac{\rho_1 A_3 - \rho_3 A_1}{\rho_1 A_3} \right). \quad (6)$$

From the general term for permeances $$\rho = \frac{\int\int \beta \cdot ds}{\int H \cdot dl} \quad (7)$$

the permeances of paths 1 and 3 can be expressed by $$\rho_1 = \frac{\mu_o \mu_r A_1}{l_1} \quad (8)$$

$$\rho_3 = \frac{\mu_o \mu_r A_3}{l_3 + \mu_r g_3} \quad (9)$$

where $\mu_o$ is the permeability of air ($4\pi \times 10^{-7}$ Henries/meter), $\mu_r$ is the relative permeability of the core material to that of air, and $g_3$ is the gap length of path 3.

Combining eqs. (6), (8) and (9), $$\beta_1 - \beta_3 = \beta_1 \left( 1 - \frac{l_1}{l_3 + \mu_r g_3} \right). \quad (10)$$

Referring to FIG. 3, assume a step voltage $E_p$ is applied across $N_{p1}$ at the time that the flux density level at point $a$ in FIG. 4. Also assume that the drive for the $E_p$ step voltage will be terminated when the path 1 flux density reaches its saturation level at point $b$. And further assume that the time between the removal of the drive $E_p$ and the step turn-OFF of $E_p$ is a delay time $t_d$. During $t_d$ assume the flux density level in path 3 will change by an amount $\Delta \beta_r$. Now during $t_d$ path 3 is supporting $E_p$ whereas prior to the start of $t_d$ (i.e., before path 1 saturated both paths were each supporting a portion of $E_p$. If $E_p$ is reversed at the termination of $t_d$, path 3 will again support the negative step for another time duration $t_d$ as the flux density in path 3 changes by a negative $\Delta \beta_r$ (see points $c$, $d$, in FIG. 4). At the end of this second $t_d$ time duration, path 1 is changed from its positive saturated state to begin supporting its normal portion of $E_p$. Because of the symmetry of the hysteresis loop of FIG. 4, only the upper portion will be discussed.

FIG. 5 is a typical timing diagram of the primary voltage as the flux density traverses the upper portion of the hysteresis loop of FIG. 4. At point $e$ an external signal is assumed to have terminated the drive step for voltage $E_p$. Then during the delay time ($t_d$) the loop is traversed to the zero flux density level at point $a$. At this point $E_p$ switches from negative to positive and the loop is traversed up to the path 1 saturation point $b$ where its drive is terminated. During the ensuing storage time $t_d$ the path 3 flux density is changed by $\Delta \beta_r$ as it supports all the input voltage ($b$, $c$, in FIGS. 4 and 5). Path 3 will support the negative $E_p$ as it starts down the backside of the loop for another $t_d$ time interval (points $c$ and $d$). At point $d$ path 1 changes from its positive saturated state to support its share of minus $E_p$.

As previously stated it is assumed that the negative-going flux density is terminated at the zero flux density level (any other flux density level could have just as well been chosen but the zero level is more convenient for this discussion). This is point $a$ in both FIGS. 4 and 5. Note that the drive terminates at a time $t_d$ before point $a$, i.e., point $e$. This represents the turn-Off delay $t_d$. For the sake of simplicity, $t_d$ on both the positive and negative portions of the $E_p$ waveform are considered equal. However, this is not a requirement. To see what would happen for unequal delay times, assume delay time $e$-$a$ in FIG. 5 is zero while $t_d$ between $b$-$c$ remains unchanged.

From FIG. 5 it can be seen that $a$ and $c$ would shift to the left by $t_d$ to switch simultaneously with the reference squarewave. This would move the saturation point of path 1 (point $b$) to the left by $t_d$ to cause the side to switch simultaneously with the opposite switching point and thus maintain a total half cycle of $t_r$. Therefore, it can be stated that this concept holds for any degree of unbalance, provided the drive for the primary voltage is allowed to terminate when path 1 saturates on either end and sufficient $\Delta \beta_r$ has been allowed for in path 3.

Now continuing the derivation of the expression for $g_3$ to give a sufficient $\Delta \beta_r$ in path 3, refer again to FIG. 4. As the loop is traversed from point $a$ to point $b$ both paths 1 and 3 are supporting the $N_p$ winding voltage $E_p$. For this portion of time, $$E_p = E_1 + E_3 = \frac{N}{t_r - t_d} (A_1 \beta_1 + A_3 \beta_3). \quad (11)$$

Combining eqs. (5) and (11), $$E_p = \frac{\beta_1 A_1 N_p}{t_r - t_d} \left( 1 + \frac{\rho_3}{\rho_1} \right) \text{ or } \beta_1 = \frac{E_p(t_r - t_d)}{N_p A_1 \left( 1 + \frac{\rho_3}{\rho_1} \right)} \quad (12)$$

Combining eqs. (10) and (12), $$\beta_1 - \beta_3 = \frac{E_p(t_r - t_d)}{(N_p A_1) \left( 1 + \frac{\rho_3}{\rho_1} \right)} \left[ 1 - \frac{l_1}{l_3 + \mu_r g_3} \right]. \quad (13)$$

Now, substituting in eqs. (8) and (9) for $\rho_3$ and $\rho_1$ in eq. (13) and equating eq. (13) to eq. (1), the result will be $$\frac{(l_3 + \mu_r g_3 - l_1)(A_3)}{(l_3 + \mu_r g_3)(A_1) + l_1 A_3} = \frac{t_d}{t_r - t_d}. \quad (14)$$

Thus, letting $t_d/(t_r - t_d) = \tau$ and solving for the air gap length in path 3:

$$g_3 = \frac{1}{\mu_r} \left( \frac{1 + \tau}{1 - \frac{A_1}{A_3} \tau} l_1 - l_3 \right). \quad (15)$$

Eq. (15) expresses the air gap length in terms of the switching time and core parameters required to keep path 3 from going past its saturation point during a given delay time $t_d$. This equation satisfies the first criteria discussed above.

To satisfy the second criteria, assume the cross sectional area $A_2$ of path 2 is equal to the sum of the cross sectional areas $A_1$ and $A_3$, then with the constraints imposed upon the air gap length by eq. (15) the question arises, what is the ratio of $A_3$ and $A_2$ that will give the lowest peak magnetizing current during a half cycle $t_r$. This total current change represented by $\Delta I_{m1}+\Delta I_{m2}$ can be expressed as $$\Delta I_{mp} = \Delta I_{m_1} + \Delta I_{m_2} = \frac{E_p(t_r - t_d)}{L_{p1}} + \frac{E_p(t_d)}{L_{p3}} \quad (16)$$

where $L_{p1} = (p_1 + p_3)(N_p^{-2})$ and $L_{p3} = (p_3)(N_p^{-2})$. Using eq. (8) and eq. (9) in $L_{p1}$ and $L_{p3}$ above and substituting these inductances into eq. (16), $$\Delta I_{mp} = \frac{(E_p)(t_r - t_d)}{\mu_r \mu_o N_p^2} \left[ \frac{1}{\frac{l_1}{A_1} + \frac{A_3}{l_3 + \mu_r g_3}} + \frac{\tau}{\frac{A_3}{l_3 + \mu_r g_3}} \right] \quad (17)$$

Combining equations (15) and (17) yields $$\Delta I_{mp} = \frac{(E_p)(t_r - t_d)}{\mu_r \mu_o N_p^2} (1 + \tau)(l_1) \left[ \frac{1}{A_1 + A_3} + \frac{\tau}{A_3 - \tau A_1} \right] \quad (18)$$

Recalling that $A_1 + A_3 = A_2$ and letting $A_3 = \alpha A_2$, then $A_1(1-\alpha)A_2$ and thus (18) can be expressed as:

$$\Delta I_{mp} = \frac{E_p(t_r - t_d)(1 + \tau)(l_1)}{\mu_r \mu_o N_p^2 A_2} \left[ 1 + \frac{\tau}{(1 + \tau)(\alpha) - \tau} \right] \quad (19)$$

and using the definition of $\tau = (t_{d/tr} - t_d)$, it can further be reduced to $$\Delta I_{mp} = \frac{E_p t_r l_1}{\mu_o \mu_r N_p^2 A^2} 1 + \left[ \frac{1}{\left(\frac{t_r}{t_d} - 1\right)} \right] \quad (20)$$

Equation (20) reveals that the minimum value of peak magnetizing current ($\Delta I_{mp}$) will occur when $\alpha$ approaches its maximum value of unity. However, $\alpha$ can never be unity since this would make $A_1$ zero. The upper limit on the value of a $\alpha$ will be determined largely by the minimum voltage that can be tolerated in path 1, and the minimum practical length of the air gap ($g_3$). In some cases a partial gapping of path 3 as shown in FIG. 3a can become advantageous.

The preceding expressions were determined based upon the ideal $\beta$-H hysteresis loop of FIG. 4. Under this assumption, the relative permeability ($\mu_r$) was constant over the $\beta$-H loop, and made a step change to zero at the saturation points. While some materials have a $\beta$-H characteristic such that the above assumption can be made with little error, others do not. For these latter materials a graphical confirmation should be made after $g_3$ is determined from eqs. (15) and (21).

Shown in FIG. 5A is a graph representative of an example of a core material that has a $\beta$-H loop which departs appreciably from the idealized version of FIG. 4. Notice how $\mu_r$ varies with magnetizing force (H). Obviously, an average value of $\mu_r$ from zero to $\beta_{max}$ will have to be used in eq. (15') for a "first cut" determination of the length of $g_3$. To determine the abovementioned graphical confirmation, multiply the vertical axis ($\beta$) in FIG. 5A by $\alpha A_2$ and the horizontal axis (H) by the path 3 mean length $l_3$. This gives a graph of flux ($\phi$) versus reluctance drop (MMF) of the core material in path 3, as shown in FIG. 5B. The $\phi$ versus MMF of the air gap $g_3$ can be expressed by $$\phi_A = \frac{(\mu_o)(g_3)(H)}{\alpha A_2} \quad (26A)$$

This is the equation of a straight line and is drawn as shown on the graph of FIG. 5B. To obtain the total reluctance drop of the path 3 material and $g_3$ air gap, add each of the individual reluctance drops for the material and air gap for various values of $\phi$. The resulting new curve will be the flux MMF relationship for the total gapped path $l_3$. An example of obtaining one point on the new curve is shown in FIG. 5B. At point $\phi_y$, the reluctance drop for the core material is MMF$_1$, and the reluctance drop for the air gap is MMF$_2$. MMF$_1$ plus MMF$_2$ is the total reluctance drop required to produce $\phi_y$ in the gapped path (as the loop is traversed in a positive direction), and hence is one point on the new $\beta$-H curve.

After the new $\beta$-H curve is drawn, select the approximate saturation point $\phi_{3max}$ for the original ungapped $l_3$ path. This can be visualized as the saturation point of a nongapped path adjacent $l_3$ with a cross-sectional area of $A_3$. Assuming $l_1 = l_3$ this visualized nongapped area is part of the $A_1$ area and thus reaches its saturation point simultaneously with the remaining portion of the $A_1$ area. If a vertical line is drawn from the $\phi_{3max}$ point on the ungapped $A_3$ curve to the lower portion of the gapped curve, its length will be equal to the actual reserve flux ($\Delta \phi_{rA}$) remaining in path 3 after path 1 saturates. Dividing $\Delta\phi_{rA}$ by $\alpha A_2$ will give the actual flux density reserve ($\Delta \beta_{rA}$) in path 3. This value must be no less than the required flux density reserve ($\Delta \beta_r$) in eq. (1) or $$\Delta \beta_{rA} \geq \frac{(E_p)(t_d)}{(N_p)(A_3)} \quad (26B)$$

If $\Delta \beta_{rA}$ is too small, $g_3$ will have to be lengthened and the above process repeated.

Turning now to FIG. 6 of the drawing, there is shown a first embodiment of a DC/DC converter in accordance with the present invention, which includes a partially gapped core 60 broken to schematically indicate the 3 paths 1, 2 and 3. Wrapped about path 1 is a feedback winding $N_f$, and wrapped about path 2 are primary windings $N_p$ and secondary windings $N_s$. A power supply $E_i$ is connected between the center tap 62 of primary winding $N_p$ and a common terminal 64. A first power transistor 66 is connected between one side 68 of winding $N_p$ and common terminal 64, and a second power transistor 70 is connected between the other side 72 of winding $N_p$ and common terminal 64. The base 74 of transistor 66 is coupled through a feedback resistor 76 to one side of feedback winding $N_f$ while the base 78 of transistor 70 is coupled to the other side of feedback winding $N_f$. The base terminals 74 and 78 are also connected to common terminal 64 by diodes 80 and 82, respectively. A bias resistor 84 provides a starting bias to the base 78 of transistor 70.

In this embodiment, only a single feedback drive winding $N_f$ is used to enclose path 1. Saturation of that path causes the feedback voltage to drop to zero. However, a comparatively large primary inductance is still available in path 3 during power switch delay time $t_d$. Thus, the saturated current rise in the primary winding $N_p$ is controlled by the inductance of path 3. The effective difference between the operation of this circuit configuration and the prior art is illustrated by the dashed line 86 in FIG. 2 of the drawing.

More particularly, winding $N_f$ furnishes feedback voltage drive to transistors 66 and 70 via feedback resistor 76. Resistor 76 controls the feedback current $i_f$ while diode 82 furnishes a return path for feedback current $i_f$ during the ON time of transistor 66. It also establishes a low voltage low impedance back-biased source for the OFF transistor 70. Diode 80 furnishes a path for feedback current $i_f$ during the opposite half cycle, i.e., the ON time of transistor 70. During this time transistor 66 is back-biased by the low voltage developed across diode 80. Note that the current rise during the power switch delay time $t_d$ is much less than that of the FIG. 1 embodiment wherein no third magnetic path exists.

In FIG. 7 of the drawing, a second embodiment of the present invention is shown having a partially gapped core schematically represented at 90. Primary windings $N_p$, secondary windings $N_s$ and a feedback winding $N_{f2}$ are all wrapped about path 2. A second feedback winding $N_{f1}$ is wrapped around core path 1. In this embodiment one side of the winding $N_{f2}$ is connected to the base 92 with a first transistor 94 through a resistor 96 and the other side of winding $N_{f2}$ is connected to the base 98 of a second transistor 100.

In this circuit the power switch turn-OFF delay time $t_d$ is decreased by providing switching transistor 94 and 100 with turn-OFF bias. A first turn-OFF circuit 102 is connected to one side of feedback winding $N_{f1}$ and operates to provide turn-OFF current to base 92, and a second turn-OFF circuit 104 is connected to the other side of $N_{f1}$ and likewise provides turn-OFF current to base 98.

The turn-OFF circuits 102 and 104 are also referenced to the common terminal 110. Winding $N_{f1}$ charges the appropriate turn-OFF circuit and at the time of saturation of path 1 causes the circuit to deliver a reverse bias to the ON transistor to drive it OFF. A power supply $E_i$ is connected between terminal 110 and the center tap of the primary winding $N_p$, and a start resistor 112 is connected between the center tap and base 92. $N_{f2}$ is a feedback winding around path 2 which furnishes feedback voltage drive for transistors 94 and 100.

Referring now to FIG. 8 of the drawing, a still further embodiment of the present invention is illustrated which as in the previous embodiments includes a partially gapped magnetic core illustrated schematically at 120, a center-tapped primary winding $N_p$ and a pair of center-tapped secondary windings $N_s$ all wrapped about the second magnetic path, and a pair of feedback windings $N_{f1}$ and $N_{f2}$ wrapped about path 1. It should be noted that although only two secondary windings are illustrated, any number of secondary windings could be used. Path 3 is the gapped path.

The converter circuit includes a pair of switching transistors 122 and 124 respectively connected between opposite ends of primary winding $N_p$ and a common terminal 126. A main power supply $E_i$ is connected between the center tap 128 and terminal 126. A generator 130 along with associated loop control circuitry 131 and turn-ON circuits 132 and 134 are provided for turning on the switches 122 and 124, respectively. Loop control circuit 131 includes a voltage divider 133 for dividing down one of the output voltages $E_o$ to provide a voltage for comparison to a reference voltage $E_{ref}$ by the comparator 135. The output of comparator 135 is then used to control a voltage amplifier 137 which amplifies $E_o$ to provide a control input for the rep-rate generator 130.

A pair of drive return and turn-OFF circuits 136 and 138 which are driven by signals obtained from the feedback windings $N_{f1}$ and $N_{f2}$ respectively, are likewise provided. Turn-ON circuits 132 and 134 are respectively comprised of series resistor and capacitor pairs 140 and 142, and 144 and 146 which form differentiating circuits coupling the output of rep-rate generator 130 to the bases 148 and 150 of transistors 122 and 124, respectively. Drive return and turn-OFF circuits 136 and 138 are identical and each is comprised of a transistor 152 (153) connected between base 148 (150) of transistor 122 (124) and the negative side of a bias battery 154, a diode 156 (157) coupled between the negative terminal of 154 and the base 158 (159) of transistor 152 (153), and a capacitor 160 (161) coupled between the base 158 (159) and the junction of a pair of resistors 162 (163) and 164 (165). Resistors 162 (163) and 164 (165) form a series circuit from one side of feedback winding $N_{f1}$ ($N_{f2}$) and the common terminal 126. The other side of winding $N_{f1}$ ($N_{f2}$) is connected to base 148 (150) of transistor 122 (124). A starting resistor 147 is also connected between center tap 128 and the base 148. One output 180 of generator 130 is connected to the base of transistor 153 through a resistor 182 and the other oupu 184 of generator 130 is connected to the base 158 of transistor 152 through a resistor 186.

Secondary winding $N_{s1}$ has a pair of rectifying diodes 200 and 202 connected between opposite ends thereof and one end of a choke coil 204. The other end of choke coil 204 is connected through a first load element 206 to the center tap 208 of $N_{s1}/N_{s2}$. A capacitor 210 is coupled across load 206.

Likewise, a pair of rectifying diodes 212 and 214 are connected between opposite ends of winding $N_{s3}/N_{s4}$ and one end of a choke coil 216, and a second load 218 is connected between the opposite end of coil 216 and the center tap 220. A capacitor 222 is connected across load 218. The choke coils 204 and 216 are wrapped about a common core.

Referring now additionally to the timing diagram shown in FIG. 9 operation of the circuit will be discussed. The voltage-controlled rep-rate generator 130 has a half-cycle time of $t_r$ as indicated at A which initiates turn-ON of the appropriate power switch 122 or 124 through turn-ON circuits 132 or 134. Once the power switch is turned ON, a feedback voltage (via $N_{f1}$ or $N_{f2}$) holds it ON until path 1 saturates to initiate turn-OFF via the appropriate turn-OFF circuit 136 or 138. For example, assume that switch 122 has been gated ON. It is then held ON by feedback voltage developed in winding $N_{f1}$. During this time ($t_0$) the turn-OFF circuit is energized.

When path 1 saturates the feedback voltage decays to allow the turn-OFF circuit 136 to drive switch 122 OFF. Drive switch 122 remains in the OFF state until it is again gated ON by generator 130. During the nonconducting half cycle, switch 122 is held OFF by a signal from generator 130 via the appropriate turn-OFF circuit. The opposite side of the converter depicted in FIG. 8 operates in the same way as just described when transistor 154 is gated ON.

Figure 9:
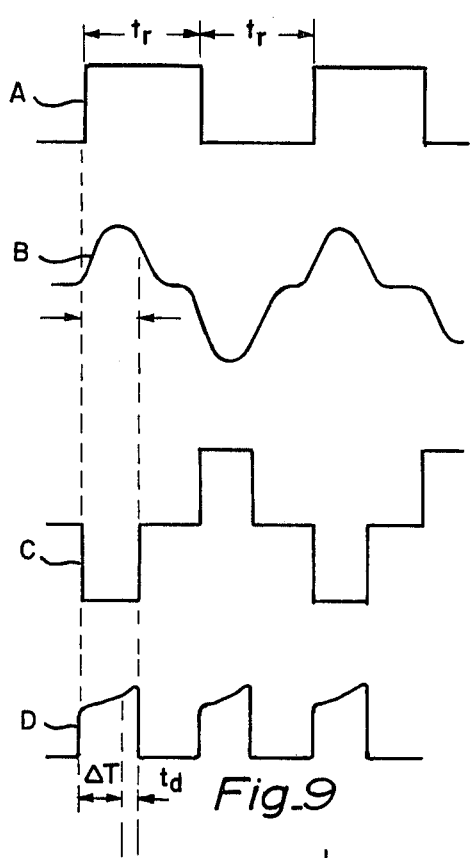

For input voltage ranges where the saturating time of path 1 is less than the generator half-cycle time $t_r$, a waveform such as that depicted at C in FIG. 9 will appear across all transformer windings. The output voltages developed across the windings $N_s$ are rectified and applied to the LC filter with a sufficiently high DC current load to prevent the rectifier currents from going to zero during their conducting half-cycle. The DC output voltage $E_0$ will be $$E_o = \frac{N_s(E_i)(t_o)}{N_p(t_r)} \tag{27}$$

assuming ideal conditions, i.e., an ideal transformer, and zero switching and rectification losses.

Referring to curve B of FIG. 9, Lenz's Law can be applied to path 1 to yield $$t_o = \Delta T + t_d = \frac{N_p(\Delta\beta_1)(A_1)}{E_1\left[\dfrac{\rho_1}{\rho_1 + \rho_3}\right]} + t_d \tag{28}$$

where $\Delta\beta_1$ is $2\beta_{max}$ of path 1, $E_1$ is the voltage supported by path 1 during $\Delta T$.

Assuming $l_1 = l_3 = l_e$, and letting $A_1 = \alpha A_2$, it can be shown that $$E_o = \frac{(2N_s)\left[1 + \left(\dfrac{1-\alpha}{\alpha}\right)\left(\dfrac{l_3 + \mu_r g_3}{l_1}\right)\right][(\beta_{max})(1-\alpha)A_2]}{t_r} + \frac{(N_s)(E_i)(t_d)}{N_p t_r} \tag{29}$$

Except for the delay time $t_d$, $E_0$ is independent of $E_i$ as expressed by eq. (29). Actually, this is not quite the actual case because of the somewhat "rounded" voltage waveform of path 1 (curve B in FIG. 9). However, the circuit of FIG. 8 does attenuate the output voltage change appropriately. The closer hysteresis loop (in FIG. 10) of path 1 comes to that of the idealized loop of FIG. 4, the more accurate the eq. (29) will become. To compensate for the percent input voltage change that reaches the output, the portion of the desired tightly controlled output $\beta E_0$ is compared to a fixed reference $E_{ref}$ by the comparator 135. This difference ($\beta E_0 - E_{ref}$) is then amplified by voltage amplifier 137 and the output $E_r$ is used to adjust $t_r$ in eq. (29) via rep-rate generator 130 to obtain the desired regulation.

Resistor 147 in FIG. 8 is used to furnish a turn-ON bias to transistor 122 when $E_i$ is applied. The feedback voltages from $N_{f1}$ and $N_{f2}$ then cause this variable pulse-width converter to operate initially as a squarewave converter until $E_0$ rises to sufficiently high enough level to supply control voltage to amplifier 137. This feature negates the requirement for a standby START circuit or a separate drive source for $A_e$. It will thus be appreciated that the circuit of FIG. 8 is closed-loop regulated via adjustment of $t_r$.

Figure 12:
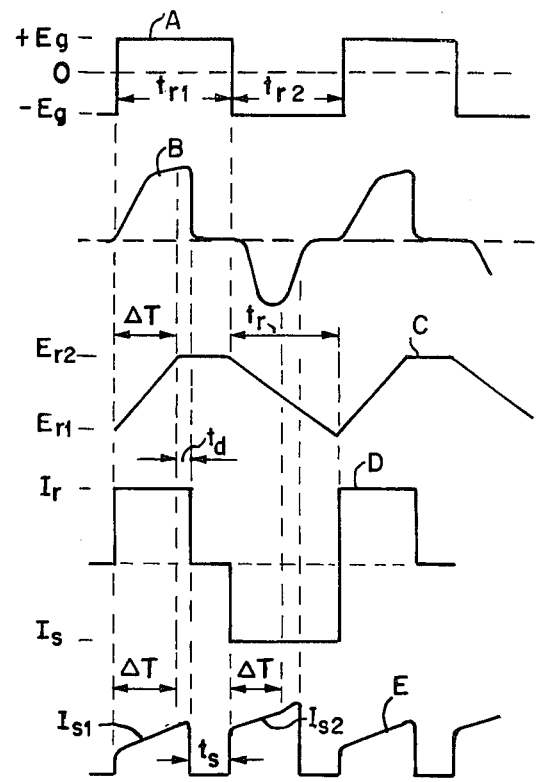
Figure 10:
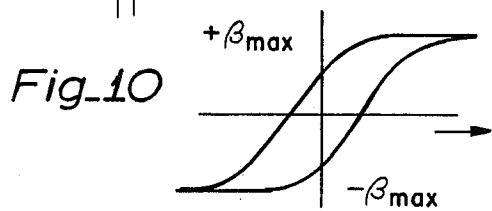
Figure 13:
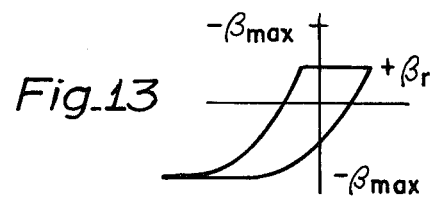
Figure 11:
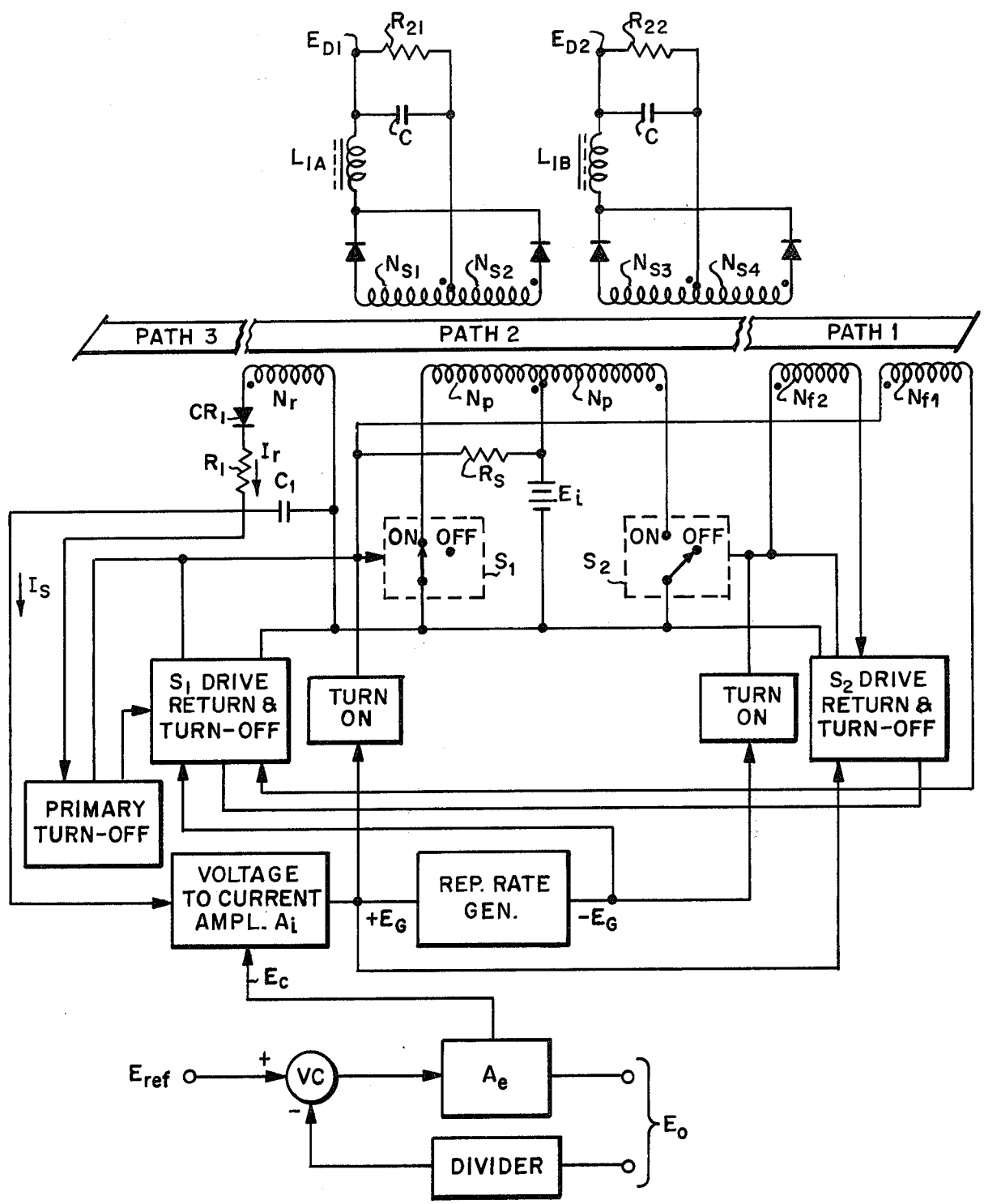

In some applications it is desirable to have closed-loop regulation that is independent of $t_r$. A circuit for accomplishing such regulation is illustrated in FIG. 11 wherein labeled blocks are substituted for many of the schematic component symbols. In this case regulation of the output voltage $E_0$ is obtained by the adjustment of $t_0$ only. $t_0$ is determined by the primary voltage $E_p$ and the negative voltage level across $C_1$ at the time $S_1$ is gated ON. The voltage across $C_1$ was reset during the immediately preceding half-cycle $t_r$ by $A_i$ current ($I_s$). FIG. 12 depicts some corresponding waveforms of FIG. 10. Note that the path 1 voltage waveform in B in FIG. 12 represents less than the full flux density excursion (see FIG. 13), i.e., from $-\beta_{max}$ to $+\beta_{max}$ that is represented by the path 1 voltage waveform B of FIG. 9 (see also FIG. 10). The ON time of $S_1$ is not determined by the time of excursion from $-\beta_{max}$ to $+\beta_{max}$ as in the previous case but by the time it takes to change the charge on $C_1$ from $E_{r1}$ to $E_{r2}$. When the $C_1$ voltage reaches $E_{r2}$ the $S_1$ primary turn-OFF circuit is energized to drive $S_1$ OFF. During the time $\Delta T$, the flux density in path 1 is changed from $-\beta_{max}$ to $+\beta_r$ (FIG. 13).

During the next half cycle ($S_2$ ON) the path 1 flux density is driven from $+\beta_r$ to $-\beta_{max}$ where $S_2$ is turned OFF in the same fashion as in the circuit of FIG. 8. Because the flux density excursion from $+\beta_r$ to $-\beta_{max}$ which occurs on the succeeding half cycle is equal to that which took place on the preceding half cycle, the $\Delta T$ of the alternate cycle is equal. This of course assumes the same voltage amplitude is impressed on each half cycle. During this half cycle ($S_2$ side ON) the voltage developed by the rep-rate generator enables $A_i$ to supply $I_s$ (FIG. 12) during time $t_{r2}$ to change the voltage on $C_1$ from $E_{r2}$ to $E_{r1}$ (curve C). $CR_1$ (FIG. 11) prevents the negative voltage developed by winding $N_r$ from interfering with the charging of $C_1$ by $I_s$. The current $I_s$ through $A_i$ is controlled by the voltage from amplifier $A_e$. A portion of the rectified and filtered load voltage $E_0$ from the circuit of FIG. 11 is divided by a divider and supplied to one input of a voltage comparator VC, the other comparator input is referenced to a fixed voltage $E_{ref}$. This difference voltage ($E_{ref} - \beta E_0$) is amplified and applied to the input of $A_i$. This makes the set current $I_s$ and thus $E_{r1}$ a function of the output voltage $E_0$ and provides closed loop regulation. As in the case of the circuit of FIG. 8 the output of $E_0$ of this circuit is theoretically independent of input voltage changes $\Delta E_i$ without any correction from the sense amplifier $A_i$. This independence is shown in the following expressions (all ideal).

Assuming that $R_1 \times C_1$ is much larger than $t_r$, $I_r$ will be approximately constant during $t_0$ (curve D of FIG. 12) and the voltage change across $C_1$ will be linear (curve C of FIG. 12). With the assumption that turn-OFF of $S_1$ is initiated at $E_{r2}$, the ON time $t_0$ is $$t_o = \Delta T + t_s = \frac{\Delta E_r C_1}{I_s} + t_s \tag{30}$$

and $$I_s \approx a_2 \frac{E_p}{R_1} \tag{31}$$

where $a_2 = N_r/N_p$.

Combining eqs. (30) and (31), $$t_o = \frac{R_1(\Delta E_r)(C_1)}{a_2 E_p} + t_s \quad (32)$$

The output voltage $E_0$ of FIG. 11 is exactly the same as that of FIG. 8. Thus, if eq. (32) is substituted into eq. (22), the output voltage is $$E_o = a_1 \left[ \frac{R_1(C_1)(\Delta E_r)}{a_2} + \frac{E_p(t_d)}{t_r} \right] \quad (33)$$

Thus, $E_0$ in eq. (33) is free of the terms $E_p$ except for the delay time $t_d$. Unlike eq. (29), eq. (33) is also free of the transformer parameters. Referring to curve C and D of FIG. 12, it can be shown that $$\Delta E_r = \frac{I_s(t_r)}{C_1} \quad (34)$$

where $I_s = A_i E_c$ (see FIG. 11). Combining eqs. (33) and (34), $$E_o = a_1 \left[ \frac{R_1(A_i E_c)}{a_2} + \frac{E_p(t_d)}{t_r} \right] \quad (35)$$

Eq. (35) also shows $E_0$ to be independent of $t_r$ (disregarding $t_d$) and $C_1$.

For closed loop operation of the partial flux density excursion circuit of FIG. 11, the output of $A_c$ is applied to the current amplifier $A_i$. For frequencies below the point where the converter energy storage components contribute, the output can be expressed as $$E_o = \frac{a_1 R_1}{a_2} \left[ \frac{A_c A_i}{1 + \frac{R_1 a_1 \beta A_c A_i}{a_2}} \right] \quad (36)$$

where $t_d$ is assumed to be 0 to simplify the equation.

$R_1$ and $C_1$ in FIG. 11 is an RC volt-time summation circuit; however, the principles as explained above hold true for any type volt-second summator that can be implemented in the embodiment.

For the rep-rate generator of FIGS. 8 and 11, a square wave converter, represented by FIG. 6 or 7, can be used advantageously. In the case of the FIG. 8 circuit, $t_r$ could be adjusted by controlling $E_i$ (FIGS. 6 or 7) with a preceding series regulator. This utilization of such square wave converters has the advantage that its primary side can operate at one potential while each secondary can operate at a potential different from the primary or other secondary potentials.

The circuits of FIGS. 8 and 11 can be closed-loop regulated on one of its outputs. The other outputs are somewhat grossly regulated as they follow the dictates of the closed-loop output. Both the circuits are advantageous in that they convert and pulse width regulate in one step. However, each output requires an individual integrating choke. This requirement can be fulfilled by a multi-winding inductor. Here, a winding for each output can be wound on a single core. Two outputs are shown but the principle is applicable to any number of outputs. It can be shown that during the time $t_0$ $$E_{LIA} = \frac{N_{s_1}}{N_p}(E_p)\left(1 - \frac{t_o}{t_r}\right) \text{ (see FIG. 11)} \quad (37)$$

and $$E_{LIB} = \frac{N_{s_3}}{N_p}(E_p)\left(1 - \frac{t_o}{t_r}\right) \quad (38)$$

During the converter "dead time" (i.e., $t_r - t_0$), $$\frac{E_{LIA}}{E_{LIB}} = \frac{E_{01}}{E_{02}} . \quad (39)$$

And combining eqs. (37), (38) and (39) gives $$\frac{N_{s_1}}{N_{s_3}} = \frac{NL_{IA}}{NL_{IB}} . \quad (40)$$

Eq. (40) verifies that as long as the ratios between the two given windings on the choke are the same as the ratios of their respective transformer secondaries, this "shared core" choke will act as an effective integrator for each of the outputs. A big advantage here is that only one winding is necessary to maintain the critical inductance. The other outputs can theoretically have zero current without peak charging their output capacitors and thus effecting their regulation.

During the conducting time of the opposite side of parallel-type converters such as those shown in FIGS. 8 and 11, the OFF switch has twice the input voltage imposed across it. In many cases, the switch does not have enough rating to withstand this double voltage. To alleviate the problem, a bridge arrangement employing four power switches can be used. This makes for a more complex circuit but has the advantage of subjecting the four switches to no more than the input voltage level.

Figure 14:
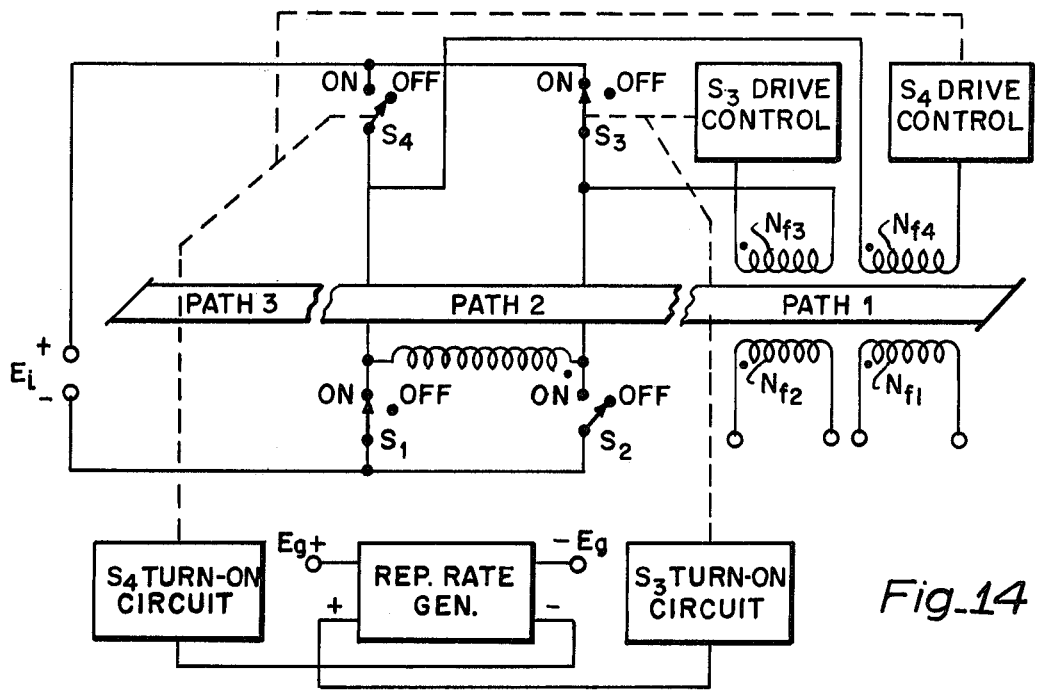

FIG. 14 shows a bridge arrangement for the converters of FIGS. 8 and 11. Only the upper portion comprised of switches $S_3$ and $S_4$ is discussed. The lower portion comprised of $S_1$ and $S_2$ is operated as previously described. Two extra windings $N_{\beta}$ and $N_{\beta4}$ have been wound around path 1 to furnish drive for switches $S_3$ and $S_4$. Also, two extra turn-ON circuits have been added from individually isolated outputs of the rep-rate generator. As the time $S_1$ is gated ON, $S_3$ is also gated ON through the $S_3$ turn-ON circuit. Feedback from $N_{\beta}$ via $S_3$ drive control holds $S_3$ ON until path 1 saturates. Then $S_1$ is turned OFF after a time duration of $t_0$. No turn-OFF circuit is necessary for $S_3$ because the turn-OFF of $S_1$ terminates the current through the path of $S_3$, $N_p$ and $S_1$. The feedback from $N_{\beta}$ is thus terminated to allow $S_3$ to turn OFF. On the alternate half cycle, $S_2$ and $S_4$ are controlled in the same way as $S_1$ and $S_3$ were.

Whereas the partially gapped core transformer has been described in terms of its utilization in static converters, its capability is not restricted to the above-described embodiments. The heart of this concept is that one main magnetic path generates flux which is shared with two or more auxiliary paths, and upon saturation of one of these auxiliary paths, a voltage change takes place in the saturated auxiliary path and also in the nonsaturated auxiliary paths. The main path and at least one auxiliary path is never driven into saturation. A winding around any of the auxiliary paths will produce a voltage change that can be used to influence an external circuit in a desired way.

FIG. 3 shows the sense winding around the ungapped saturating path 1. Here the voltage decays toward zero as this path saturates; however, the voltage in path 3 increases by the same amount that the voltage in path 1 decreases. Thus, $N_f$ could be wound around path 3 to sense saturation of path 1. There is also no restriction that any of the auxiliary paths remain ungapped or that any of the path lengths or cross sections be equal. The object is to make the reluctance of one auxiliary path a given amount more or less than the reluctance of another auxiliary path by the adjustments of the air gaps in these paths. These air gap adjustments will determine which path saturates first. Many auxiliary paths with different air gap dimensions can be used to cause the auxiliary paths to saturate in succession to give a "staircase" voltage output across a winding wound about a nonsaturating auxiliary path when a step voltage input is applied across the winding around main path 2.

For example, referring to FIG. 3A, suppose that the right-hand leg of the core is gapped with many small equal areas shaped like $A_3$. Also assume the length of the air gap of each of these small areas is longer than that of the air gap length of the preceding area. In this case, all the mean lengths of the magnetic paths, that are projections of the small equal areas around $l_3$ are equal to $l_3$. But their reluctances are all different because of different air gap lengths. Now assume the left leg ($l_1$) of FIG. 3A has an air gap of such length to assure that it will not saturate during the time it takes all the paths on the right side to saturate. If a winding is wound around the center portion (path 2) and a step voltage is applied, a stairstep voltage with a number of steps equal to the number of gapped areas in the right leg will be generated across a winding around the nonsaturating auxiliary leg. In this case the duration of each step will become progressively shorter (timewise) from the first to the last step because of the successively higher portion of the path 2 winding voltage that the next gapped path has to support. However, the steps can be made to have any desired time relationship to each other by adjustment of the individual areas and/or lengths of the air gaps.

Although the present invention has been described above with reference to several particular embodiments, it is contemplated that many alterations and modifications will be apparent to those skilled in the art. Accordingly, it is intended that the disclosed embodiments be considered as examples rather than as limitations, and that the following claims be interpreted as covering all such alterations and modifications as fall within the true spirit and scope of the invention.

What is claimed is:

1. Static converter apparatus comprising:
   transformer means including a unitary ferromagnetic core of uniform permeability having portions forming first, second and third flux paths, said portions being arranged so that the flux flowing in said first path and said third path flows through the portion of said core forming said second path, the portion of said core forming said third path having a gap for causing the reluctance of said third path to be greater than the reluctance of said first path, a primary winding wound about the portion of said core forming said second path, sense winding means wound about the portion of said core forming said first path, and a plurality of secondary windings wound about the portion of said core forming said second path;
   input circuit means including a DC power source, and switching means for alternately causing current supplied by said source to flow in opposite directions through said primary winding, said switching means being controlled by the voltage developed across said sense winding means; and
   output circuit means including means for rectifying current developed in said secondary windings to provide DC outputs and filter means associated with each said secondary winding, each said filter means including a choke coil, at least some of said choke coils being wound about a common core.

2. Static converter apparatus as recited in claim 1 wherein said switching means include first and second transistors respectively connected between one side of said power source and opposite ends of said primary winding, and wherein said transformer means further includes a feedback winding wound about the portion of said core forming said second path, said feedback winding being coupled to the bases of said first and second transistors for providing base drive therefor.

3. Static converter apparatus as recited in claim 2 wherein said input circuit means further includes turn-OFF circuit means connected between said sense winding means and the bases of said transistors, and turn-OFF circuit means being operative to drive an ON one of said transistors sharply OFF when the voltage developed across said sense winding means begins decaying toward zero.

4. Static converter apparatus as recited in claim 2 wherein said input circuit means includes turn-ON circuit means responsive to said DC output and operative to turn an OFF one of said transistors sharply ON at a repetition rate that is dictated by a predetermined output DC voltage level.

5. Static converter apparatus as recited in claim 4 wherein said turn-ON circuit means includes means for comparing said DC output to a fixed reference to develop a control signal and signal generator means responsive to said control signal and operative to generate a train of pulses for controlling said turn-ON circuit means.

6. Static converter apparatus as recited in claim 5 wherein said input circuit means further includes turn-OFF circuit means connected between said sense winding means and the bases of said transistors, said turn-OFF circuit means being operative to drive an ON one of said transistors sharply OFF when the voltage developed across said sense winding means begin decaying toward zero.

7. Static converter apparatus as recited in claim 2 wherein said switching means includes third and fourth transistors connected between said one side of said power source and said opposite ends of said primary winding and wherein said input circuit means generates control signals for driving said third and fourth transistors.

8. Static converter apparatus as recited in claim 1 wherein said gap in said ferromagnetic core has a length $g_3$ determined by the expression $$g_3 = \frac{1}{\mu_r}\left[\frac{1+\tau}{1-\frac{A_1}{A_3}\tau} l_1 - l_3\right]$$

where
$\mu_r$ is the relative permeability of the core material to that of air,
$\tau$ is the ratio of the switching means turn-OFF delay $t_d$ to the difference between the switching means half cycle $t_r$ and $t_d$,
$A_1$ is the cross sectional area of said first flux path,
$A_3$ is the cross sectional area of the gap in said third flux path,
$l_1$ is the mean length of said first flux path, and
$l_3$ is the mean length of said third flux path.

9. Static converter apparatus as recited in claim 8 wherein the peak magnetizing current ($\Delta I_{mp}$) is determined by the expression $$\Delta I_{mp} = \frac{E_p t_r l_1}{\mu_r \mu_o N_p^2 A_2}\left[1 + \frac{1}{\left(\frac{t_r}{t_d}\right)\left(\frac{A_3}{A_2}\right) - 1}\right].$$

10. Static converter apparatus as recited in claim 1 wherein said switching means include first and second electrically actuable switches respectively connected between one side of said power source and opposite ends of said primary winding, and wherein said transformer means further includes a feedback winding wound about the portion of said core forming said second path, said feedback winding being coupled to the control terminals of said first and second switches for controlling actuation thereof.

11. Static converter apparatus as recited in claim 10 wherein said input circuit means further includes turn-OFF circuit means connected between said sense winding means and said control terminals, said turn-OFF circuit means being operative to drive an ON one of said switches sharply OFF when the voltage developed across said sense winding means reaches a predetermined level.

12. Static converter apparatus as recited in claim 11 wherein said input circuit means includes turn-ON circuit means responsive to said DC output and operative to tun an OFF one of said switches sharply ON when said DC output reaches a predetermined level.

13. Static converter apparatus as recited in claim 12 wherein said turn-ON circuit means includes means for comparing said DC output to a fixed reference to develop a control signal when said DC output is equal to said reference, and signal generator means responsive to said control signal and operative to generate a train of pulses for controlling said turn-ON circuit means.

* * * * *